March 23, 1926.

P. H. GASKINS 1,578,118

COMBINED FASTENER AND HANDLE FOR AUTOMOBILE DOORS

Original Filed July 26, 1923

WITNESSES

W. A. Williams

INVENTOR

P. H. Gaskins.
BY Munn &co.

ATTORNEYS

Patented Mar. 23, 1926.

1,578,118

UNITED STATES PATENT OFFICE.

PALEMON H. GASKINS, OF JACKSONVILLE, FLORIDA.

COMBINED FASTENER AND HANDLE FOR AUTOMOBILE DOORS.

Application filed July 26, 1923, Serial No. 654,013. Renewed February 3, 1926.

*To all whom it may concern:*

Be it known that I, PALEMON H. GASKINS, a citizen of the United States, and resident of Jacksonville, in the county of Duvall and State of Florida, have invented certain new and useful Improvements in Combined Fasteners and Handles for Automobile Doors, of which the following is a specification.

This invention relates to an improvement in fastening devices and is especially designed for use as a combined fastener and handle on automobile doors.

The object of the invention is to provide a device of this character which may be conveniently gripped to simultaneously release the latch and open the door and which is at the same time of simple and durable construction and easy and comparatively inexpensive to manufacture while occupying a minimum of space on the door so as not to interfere with the use of sliding glass panels in closed car constructions and presenting an attractive and ornamental appearance.

Other objects and advantages reside in certain novel features of the construction, arrangement and combination of parts which will be hereinafter more fully described and particularly pointed out in the appended claims, reference being had to the accompanying drawings forming a part of this specification and in which—

Figure 1:
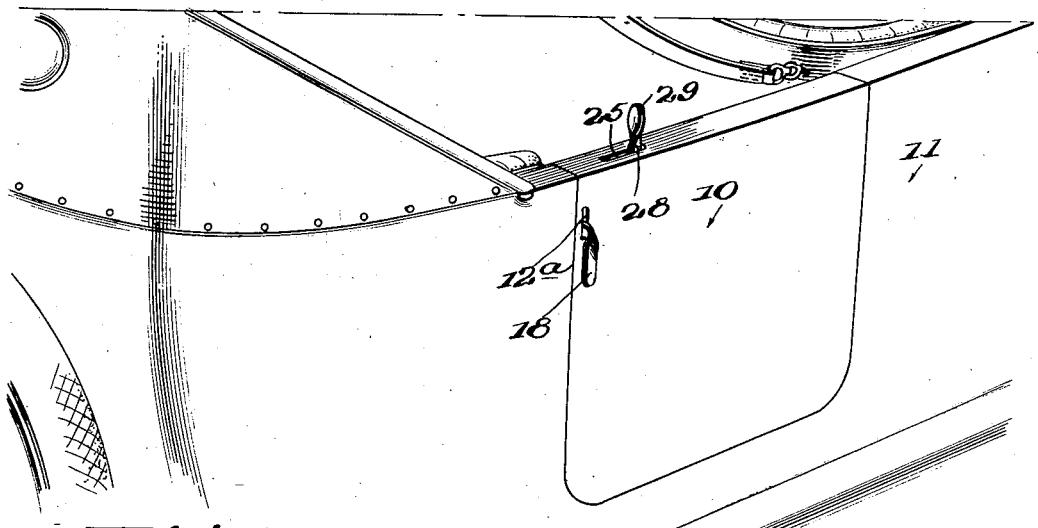
Figure 1 is a fragmentary perspective view showing an automobile door equipped with the present invention.
Figure 2:
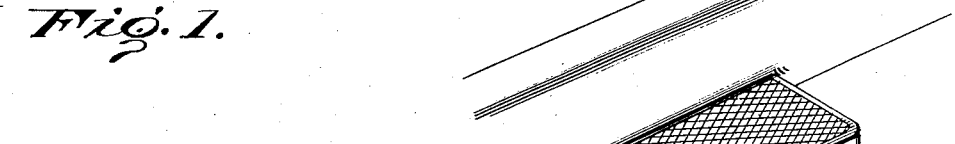
Figure 2 is a view in end elevation showing the invention applied to an automobile door.
Figure 3:
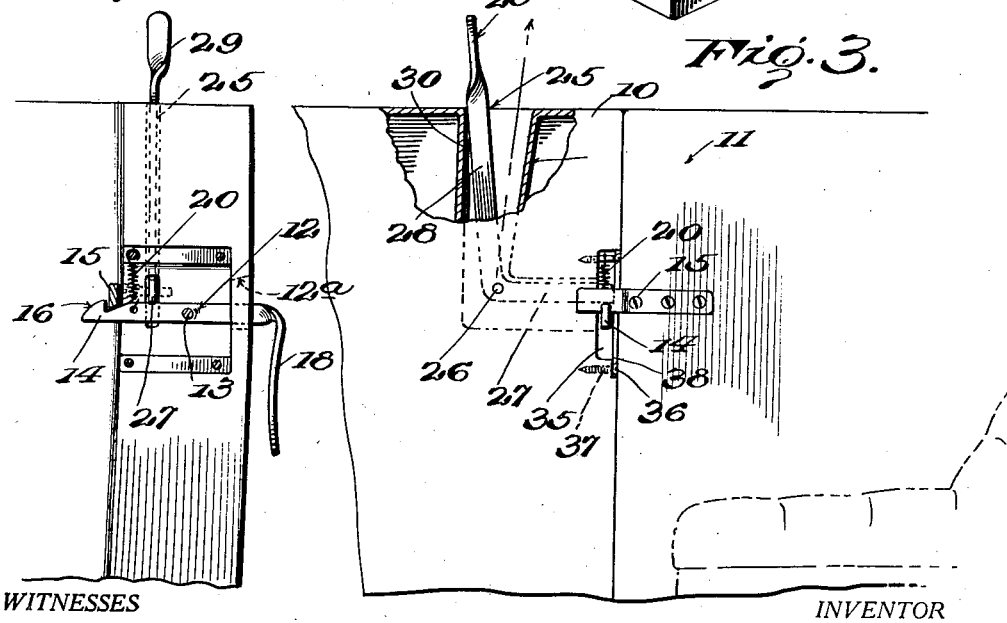
Figure 3 is a fragmentary view with parts shown in side elevation and parts broken away and shown in section.

Referring to the drawings wherein for the sake of illustration is shown a preferred embodiment of the invention the numeral 10 designates an automobile door mounted in any conventional manner on the automobile body 11.

The combined fastener and handle which constitutes the present invention comprises a latch bar 12 pivotally mounted as at 13 on the car door so as to swing in a vertical plane.

At one end the latch bar is formed with a hook 14 which co-acts with a keeper 15 secured to the car body. The nose of the hook is curved as at 16 so that the latch bar when the door is being closed will be automatically cammed into locking engagement with the hook. On the end of the latch bar opposite the hook 14 a handle 18 is integrally formed, the handle being disposed exteriorly of the automobile door and extending in spaced relation thereto and at right angles to the latch bar 12. Preferably the latch bar and the handle are constructed of a single piece of metal, the handle being bent and twisted at right angles to the latch bar. With this arrangement when the handle 18 is gripped and a pull exerted thereon it swings the latch bar 12 around its pivot or fulcrum 13 so as to disengage the hook 14 from the keeper 15 and so as also to simultaneously open the door. This simultaneous and duofold action of the device is facilitated by virtue of the fact that the handle extends downwardly and that the pull exerted by the same is naturally upwardly as well as outwardly. By twisting the handle 18 relative to the latch bar the metal constituting the handle presents a flat broad surface susceptible of convenient gripping and at the same time the latch bar 12 is so disposed as to permit of ready and easy formation of the hook 14.

A retractile coiled spring 20 is provded and is connected with the latch bar so as to tend to swing the same upwardly and into engagement with its keeper.

In order to facilitate release of the latch from the inside of the car a bell-crank lever 25 is provided and is fulcrumed as at 26 on the car door. One arm of the bell-crank lever designated at 27 is engaged with the latch bar 12 and the other arm 28 of the bell-crank lever projects up above the car door and is formed with a gripping portion 29. The bell-crank lever operates in an L-shaped slot provided therefor in the car door and the walls 30 of the vertical leg of this slot limit the movements of the bell-crank lever. It is also to be noted that the latch bar 12 operates in a slot 12$^a$ and that the walls of this slot 12$^a$ limit the movement of the latch bar. The provision of the bell-crank lever 25 is especially desirable on closed car constructions where it is frequently necessary to open the door from the inside.

The entire device is capable of advantageous use on closed cars for it will be noted that the latch bar 12 occupies but a minimum space at one end of the door and that the bell-crank 25 occupies but a minimum of space at one side of the door. This permits of the use of glass panels approximating the size of the door for the bell-crank lever is laterally spaced from the plane of said glass and the latch bar hardly requires any more room than a thin end wall or stanchion of the door proper.

The latch bar 12 and its spring 20 are both accommodated in a small opening or pocket 35 provided at one end of the car door, the opening being covered or closed by a plate 36 countersunk in the car door and secured in position by screws 37, the plate having inwardly projecting flanges 38 engaging the walls of the opening 35, the flanges being slotted or cut away to permit the latch bar to pass therethrough and partake of its necessary movements.

Having thus described the invention, what I claim is:—

1. A combined fastener and handle for automobile doors comprising a latch bar extending transversely of the door and pivotally mounted thereon, a handle for the latch bar disposed exteriorly of the door and extending along the outer face of the door in spaced relation thereto and adapted to be conveniently gripped and pulled for simultaneously releasing the latch and opening the door.

2. A combined fastener and handle for automobile doors, comprising in combination with a keeper mounted on the automobile body, a latch bar pivotally mounted on the door and having a hooked end engageable with the keeper, a downwardly extending handle rigidly connected to the latch bar and disposed exteriorly of the door, the handle extending at right angles to the latch bar in spaced relation to the outer face of the door, and a spring connected with the latch bar for urging it into engagement with the keeper.

3. A combined fastener and handle for automobile doors, comprising in combination with a keeper mounted on the automobile body, a horizontally disposed latch bar pivotally mounted on the door and extending transversely thereof, said latch bar having a hooked end engageable with the keeper, a handle rigidly connected to the latch bar and disposed exteriorly of the door, the handle extending at right angles to the latch bar and depending vertically therefrom, a spring connected with the latch bar for urging it into engagement with the keeper, and a bell-crank lever mounted on the door to swing in the plane of the door, said lever having an arm cooperable with the latch bar for releasing the same and also having an arm projecting above the door to facilitate operation of the bell crank from the inside.

PALEMON H. GASKINS.